April 1, 1969 H. M. EZEKIEL 3,435,947

ARTICLE HAVING AN EXPANDABLE AND RIGIDIZABLE COMPACTED FLEXIBLE MATERIAL

Filed Nov. 26, 1965

INVENTOR
HERBERT M. EZEKIEL

BY Louis A. Kline
Justin [signature]

HIS ATTORNEYS

United States Patent Office 3,435,947

Patented Apr. 1, 1969

3,435,947
ARTICLE HAVING AN EXPANDABLE AND RIGIDIZABLE COMPACTED FLEXIBLE MATERIAL

Herbert M. Ezekiel, Dayton, Ohio, assignor to The National Cash Register Company, Dayton, Ohio, a corporation of Maryland Filed Nov. 26, 1965, Ser. No. 509,828
Int. Cl. B65d *79/00*
U.S. Cl. 206—47 8 Claims

ABSTRACT OF THE DISCLOSURE

An article having a container holding a compacted flexible material such as a polyurethane foam impregnated with a polymerizable substance. Minute capsules containing a material which induces polymerization of the polymerizable substance are positioned in proximity to the flexible material as by adhesive bonding. The compacted flexible material is removed from the container and expanded to its original shape. The polymerization inducing material is released from the minute capsules to contact the polymerizable substance causing it to polymerize to a hardened state resulting in the rigidizing of the flexible material.

This invention relates to the package art and to a storable and easily transportable package device containing a compacted flexible material which can be expanded, and means for rigidizing the flexible material after its expansion. More particularly, it relates to a device containing a compacted flexible material—for example, a foam or the like—having positioned in proximity thereto a plurality of minute capsules. The foam is impregnated with a polymerizable composition, and the capsules contain a gaseous or liquid compound which, when released, activates the polymerization of the impregnating composition to rigidize the foam.

In many instances, the transportation and storage of large, low-density articles is beset with difficult problems, such as the limited-space capacity available in the transport vehicle. Such problems become particularly acute when the means for transporting these articles—for example, by space vehicle or by individual persons—has a very small volume and/or area capacity in relation to the ultimate desired size of the articles; for example, a twenty-foot-in-diameter solar reflector or a small boat. These problems largely can be eliminated if such articles can be compacted in some manner to occupy a much smaller volume and/or area during their transportation and storage and restored to their final large configuration upon arrival at their point of destination.

Accordingly, it is a principal object of this invention to provide an easily transportable compact device containing an expandable, flexible material and means for rigidizing the material after its expansion.

A further object is to provide a compact device having a structure such that it can be stored for indefinite periods of time without premature expansion or activation of the rigidization means contained within the device.

It is a further object of the invention to provide a device which contains a compacted, flexible material which can be easily and quickly expanded and rigidized into a permanent predetermined size and shape.

These and other objects and advantages will become apparent from the following description and from the drawings, illustrative only of several embodiments of applicant's invention.

In the drawings, all of which are semi-diagrammatic:

Generally speaking, there has been developed a package having a flexible material which has been folded, compressed, or otherwise compacted into as small a space as practical within the package. This flexible material, which can be a foam, a cloth, or the like, contains interstices and is impregnated with a polymerizable composition. A chemical compound for activating the polymerization of the impregnating composition is contained in small capsules positioned within the package in proximity to the flexible material; for example, by bonding the capsules to the exterior surface of the compacted material. An outer container, which can be either a rigid or a flexible material, retains the compacted, impregnated flexible material in the confined space inside the container.

Figure 1:
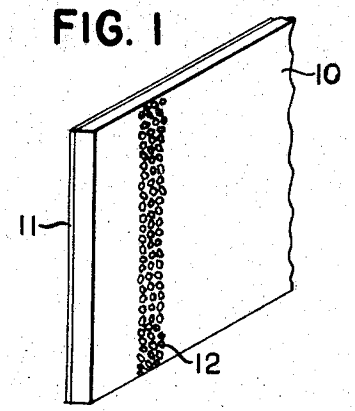
FIGURE 1 is an elevational view of the expanded configuration of the flexible portion of a preferred embodiment of applicant's device prior to its being compacted as part of the devices illustrated in the remaining figures of the drawings.
Figure 2:
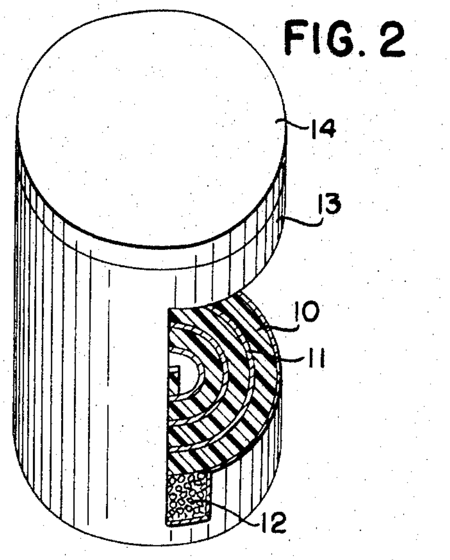
FIGURE 2 is an elevational view of a preferred illustrative embodiment of applicant's invention, having several cut-away sections to show the details of the structure.

More specifically, with particular reference to FIGURES 1 and 2 of the drawings, there is shown a reflector having a compressible, flexible, polyurethane foam backing 10 in its original predetermined shape prior to its being compacted (FIGURE 1) and after it has been compacted (FIGURE 2). A flexible sheet of reflective material 11—for example, aluminized Mylar—is bonded to the front surface of the foam. The foam is impregnated with a polymerizable composition comprising, for example, a monomer such as tetraethylene glycol dimethacrylate and an initiator such as benzoyl peroxide. There is bonded to the rear surface of the foam a plurality of minute capsules 12, each containing a compound, such as diethyl aniline, which, when released from the capsules, causes the polymerization of the impregnating composition to rigidize the foam.

In FIGURE 2, a container 13, having a lid 14 threaded on one end, contains the structure of FIGURE 1 in a compacted, rolled-up form.

The device shown in FIGURE 2 can be easily and quickly utilized to produce a rigidized foam structure such as that illustrated in FIGURE 1. The lid is removed, and the foam structure is taken out of its container. Because of its resiliency, the foam immediately expands to its original shape. The capsules are then ruptured by any means, such as the application of heat or pressure to them. This permits the liquid or gaseous compound contained in the capsules to contact the composition with which the foam is impregnated to activate the polymerization of the composition. As the polymerization continues to completion, the foam is rigidized to a permanent, hard shape.

Figure 3:
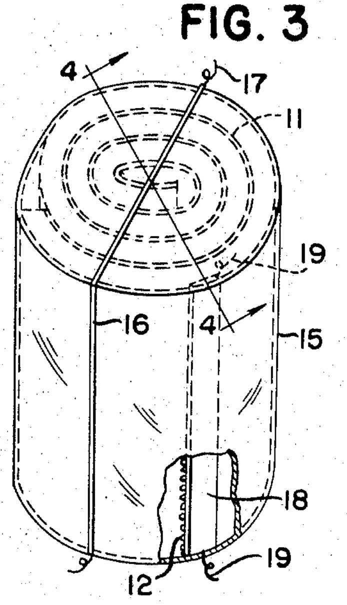
FIGURE 3 is an elevational view of another embodiment of applicant's invention, having a transparent container which permits a view of the structural details.
Figure 4:
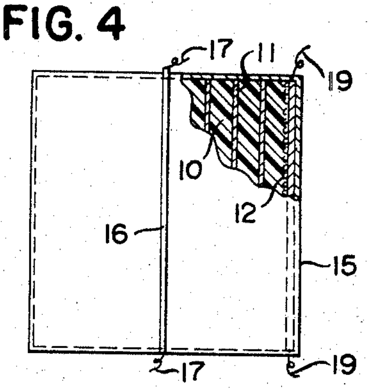
FIGURE 4 is a partial cross-sectional view of FIGURE 3 taken on line 4—4, looking in the direction of the arrows.

In FIGURES 3 and 4, another embodiment of applicant's device includes a flexible foam 10 which has a reflector surface 11 bonded to its face and capsules 12 bonded to its back. The foam is impregnated with a polymerizable composition, and the capsules contain a compound which activates polymerization of the impregnating composition. A transparent container 15 encloses the impregnated foam structure. A pyrofuse wire 16, having electrical contact wires 17 attached thereto, is embedded in the container. A flexible heater strip 18, such as a Nichrome heater, to which contact wires 19 are attached, is bonded to the back of the foam in the area of the capsules, particularly as shown in FIGURE 4.

Figure 5:
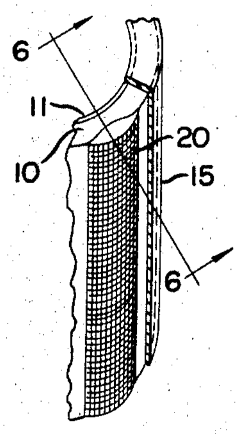
FIGURE 5 is a partial elevational view of a further illustrative embodiment, again utilizing a transparent container to view details of construction.
Figure 6:
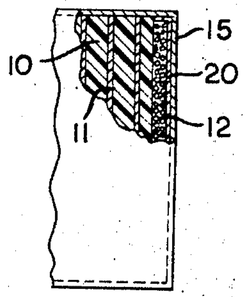
FIGURE 6 is a partial cross-sectional view of FIGURE 5 taken on line 6—6, looking in the direction of the arrows.

Still another embodiment of the invention is shown in FIGURES 5 and 6, the structure of which is the same as that shown in FIGURES 3 and 4 except for the means for retaining the minute capsules 12 in close proximity to the foam 10. The capsules are contained in a porous pouch 20, which is bonded to the back of the foam. The pouch is sufficiently gas- and liquid-permeable to permit escape of the chemical activator compound from the pouch when the capsules are broken by pressure applied to the exterior of the pouch.

The two embodiments of applicant's device shown in FIGURES 3 and 4, and FIGURES 5 and 6, respectively, can be employed to expand and rigidize the foam structure at will. In each of the embodiments, the container is split open by attaching the pyrofuse contact wires 17 to a source of electric current (not shown) and activating this current to cause the pyrofuse to burn. Once the container is laid open, the foam, because of its resiliency, will, as aforementioned, expand to its original shape, similar to that shown in FIGURE 1. Following expansion of the foam, the device shown in FIGURES 3 and 4 can now be rigidized by attaching the Nichrome heater contact wires 19 to a source of electric current (which may be the same as that to which the pyrofuse contact wires 17 were previously attached) and turning on this current to cause the Nichrome flexible strip to heat. The walls of the minute capsules lying in proximity to the heater strip are melted by its heat, whereby the previously confined chemical compound is released and contacts the impregnating composition within the interstices of the foam 10. This activates the polymerization of the impregnating composition, which, when completed, results in a hard, permanent, rigid foam structure.

The modification of the present device shown in FIGURES 5 and 6 can be employed in the same manner as that disclosed in FIGURES 3 and 4, with the exception of the capsule-rupturing means. The minute capsules contained in the pouch 20 are ruptured by application of pressure to the exterior of the pouch. Again, this releases the chemical activator compound to ultimately result in the complete rigidization of the foam, as described above.

It is to be understood that the container employed in the present device can be of any shape or configuration, so long as it retains the impregnated flexible material within its confines. For example, it can be a metal canister or a flexible material such as a thin plastic sheet, as shown in FIGURES 3 to 6, which is wrapped around the compacted flexible material and sealed by heating the overlapping edges.

The flexible materials utilized in applicant's device can be of any type that contains interconnecting interstices. Cloth, of either natural or synthetic origin—for example, cotton or nylon, respectively—can be utilized. Glass cloth and other synthetic inorganic porous sheet materials can also be employed for the purposes of this invention. A flexible material of this type can be folded or rolled into any desirable compact configuration, placed in its container, and transported to its ultimate destination, where it can be removed from its container, unfolded, and rigidized as desired. Preferably, the flexible material is also resilient and, once freed from its container, expands to its original configuration of its own accord. Exemplary of such materials are the foams of natural origin, such as sponges and reinforced cellulose, and those of synthetic origin, such as foam rubber, polyurethane foams, and polyvinyl chloride foams. These materials not only can be folded, rolled, and the like, into a much more compact configuration, but also can be compressed to form an even smaller package. Obviously, the amount of compression of the cellular material must not be so great as to prevent its return to substantially its original shape once the compression is removed, and is ultimately dependent upon the type of material employed, the amount of space available for compression, etc.

The impregnating composition can be introduced into the flexible material in any convenient manner, as by soaking the flexible material in the composition, which is absorbed into the interstices. Other methods, such as spraying the impregnating composition over the surface of the flexible material, from which it is absorbed into the material, can also be employed. The composition can comprise any polymerizable material which is inert with respect to the flexible material and which wets the walls of the interstices of the flexible material, and the polymerization reaction of which is self-propagating. In this instance, "self-propagating reaction" means that the reaction, once initiated at one or more points, will continue to completion. It is meant to include both polymerization reactions which require catalysts to continue to completion and those that do not. Exemplary, but by no means limiting, of the polymerizable materials which can be employed are monomers containing ethylenic unsaturation which polymerize through the unsaturated double bond to form large polymeric molecules. When such polymerization takes place within the interstices of the flexible material, a permanent, hard, polymer network is formed, which rigidizes the formerly flexible material. Particularly preferred impregnating compositions comprise homogeneous mixtures of the divinyl monomers, such as the acrylates and dimethacrylates; for example, tetramethylene diacrylate, ethylene glycol dimethacrylate, tetraethylene glycol dimethacrylate, and the like, and any of the various well-known free-radical vinyl polymerization initiators; for example, benzoyl peroxide, benzoin methyl ether, cumene hydroperoxide, and the like. When initiated by a compound such as dimethyl aniline, diethyl aniline, or other material well known in the art as a free-radical vinyl polymerization activator, the polymerization of the aforementioned impregnating compositions proceeds to completion at a desirably rapid rate.

The impregnating composition also can contain other ingredients, such as those which impart thixotropic properties to the impregnating composition; for example, various types of silica such as "Cab-O-Sil," bentonite clays, and the like; and well-known inhibitor compounds; for example, hydroquinone, 1,1-diphenyl-2-picrylhydrazyl, phenothiazine, and the like, which prevent the premature polymerization of the ethylenically unsaturated monomers. The proportions of the materials utilized in the impregnating compositions are well known to those skilled in the art. For example, from about 0.1% to about 3% by weight of the catalyst based on the total weight of the catalyst and the monomer can be employed. The desired amount of these, as well as the other aforementioned ingredients, can easily be determined by one skilled in the art and ultimately depend on the individual ingredients employed, the desired speed of reaction, etc.

The chemical activator compounds can be encapsulated with any wall material, providing that the two are chemically inert; that is, do not react at any stage of the encapsulation process. Examples of processes of encapsulation which are well known in the art, and which can be employed herein, are disclosed in United States Patents No. 2,800,457, issued to Barrett K. Green and Lowell Schleicher on July 23, 1957; No. 2,800,458, issued to Barrett K. Green on July 23, 1957; and No. 3,190,837, issued to Carl Brynko and Joseph A. Scarpelli on June 22, 1965. Any of the wall materials disclosed in those patents are acceptable for encapsulating the activator compounds, but, as a practical matter, the final selection of any individual wall material depends on its strength, melting point, and other like considerations, well known to the routineer in the art, for which it would be preferred for specific end products. The capsules produced by the methods disclosed in these patents can range in size from microscopic—for example, about 10 microns—to about one eighth inch as the largest. The capsules can be positioned over any portion of the flexible material, as by adhesive bonding, wherever the release of the activator compound contained therein will result in its contacting the composition with which the flexible material is impregnated. Obviously, the greater the area covered by the capsules, the shorter is the rigidization time, since the polymerization of the impregnating composition is activated at a greater number of places.

When the flexible materials employed are synthetic foams, such as the polyurethane foams, the capsules can be retained within the foam material itself by being bonded to the flexible heater strip and by foaming the polyurethane around both. Alternatively, two pieces of foam may be bonded together to form a foam laminate structure having the heater strip and the capsules lying between the two pieces of foam.

Although the following example is illustrative of one group of chemical components which can be utilized to rigidize the flexible material contained within the device of this invention, it is to be clearly understood that many other equivalent chemical compounds, in addition to the ones mentioned in this application, also can be employed.

*Example*

One hundred cc. of each of the activator compounds, dimethyl aniline and diethyl aniline, were encapsulated according to the procedure employed in United States Patent No. 3,190,837, column 3, line 66, to column 5, line 56, utilizing the following proportions of ingredients:

| | | |
|---|---|---|
| Water | cc | 500 |
| Gelatin (11%, by weight, aqueous sol.) | grams | 90 |
| Gum arabic (11%, by weight, aqueous sol.) | do | 90 |
| DX 843–11 [1] | cc | 20 |
| DX 843–31 [1] | cc | 20 |

[1] Both polyethylenemaleic anhydride copolymers fully identified in United States Patent No. 3,190,837, at column 4, lines 1 to 11, and column 4, line 68, to column 5, line 2, respectively.

Although the proportions of the ingredients and the internal phase—that is, the activator compounds encapsulated in the present example—differed from those disclosed in the patent, the procedure used was the same.

An aqueous solution of glutaraldehyde was used to cross-link the capsule walls. The resulting capsules were washed, filtered, and dried.

The recovered capsules, in the amount of 2.7 grams, were positioned in an appropriate circular configuration on the back of a one-quarter-inch-thick, eight-inch-in-diameter circular polyurethane foam which previously had been soaked in 60 grams of a composition comprising a monomer, tetraethylene glycol dimethacrylate, 4% by weight of "Cab-O-Sil," a pyrogenic colloidal silica produced by the Cabot Corporation, and about 1.5% by weight of an initiator, benzoyl peroxide, both of the latter being based on the weight of the monomer. A two-foot length flat, flexible Nichrome heating strip was brought into contact with the capsules and heated in order to melt the capsule walls and release the activator compound. After release of the activator, rigidization of the flexible polyurethane foam to a permanent, hard structure was completed in three minutes.

What is claimed is:

1. A storable and transportable article comprising a flexible material which can be expanded into a predetermined shape and rigidized in such shape at will, said flexible material having interconnecting interstices therein and being confined in a space more compact than said predetermined shape, said flexible material further being impregnated with a composition comprising a polymerizable substance which, upon reaction contact with a material which induces the polymerization of said substance, polymerizes to a hardened state, thereby rigidizing said flexible material; means for confining said flexible material and said polymerizable substance in said confined space; minute capsules containing said polymerization-inducing material and being capable of releasing said polymerization-inducing material, said capsules preventing contact of the polymerization-inducing material and the polymerizable substance until the polymerization-inducing material is released from the capsules; and means in said confined space for retaining the minute capsules in proximity to said flexible material prior to and after the expansion of the flexible material, the means in the confined space permitting contact of said polymerizable substance and said polymerization-inducing material upon release of the latter from said minute capsules.

2. The article of claim 1 in which the flexible material is a foam.

3. The article of claim 1 which additionally comprises means for releasing said polymerization-inducing material from said minute capsules.

4. The article of claim 3 in which the flexible material is a foam and in which the means for releasing the polymerization-inducing material from said minute capsules in a flexible electrically conductive element bonded to the foam, said flexible element, upon having an electric current flow through it, producing sufficient heat to melt the minute capsule walls, thereby releasing the polymerization-inducing material into reaction contact with the polymerizable substance.

5. The article of claim 1 in which the impregnating composition additionally comprises an initiator for the polymerization of the polymerizable substance.

6. The article of claim 5 in which the impregnating composition additionally comprises colloidal silica.

7. The article of claim 6 in which the polymerizable substance is tetraethylene glycol dimethacrylate.

8. The article of claim 2 in which the means for retaining the minute capsules in the confined space is a pouch which is bonded to the foam and which contains the minute capsules, said pouch being sufficiently gas- and liquid-permeable to permit escape of said polymerization-inducing material upon its release from said minute capsules.

References Cited

UNITED STATES PATENTS

| | | | |
|---|---|---|---|
| 2,580,414 | 1/1952 | Daffey | 206—84 |
| 2,980,941 | 4/1961 | Miller | 15—104.93 |
| 3,136,832 | 6/1964 | Ballmer | 264—255 |
| 3,190,837 | 6/1965 | Brynko et al. | 117—100 X |
| 3,242,244 | 3/1966 | Maly | 117—62.2 X |
| 3,260,618 | 7/1966 | Stark | 117—138.8 X |

WILLIAM D. MARTIN, *Primary Examiner.*

M. LUSIGNAN, *Assistant Examiner.*

U.S. Cl. X.R.

117—33, 62.2, 138.8; 161—159; 206—59; 260—2.5